United States Patent
Suzuki et al.

(10) Patent No.: US 8,077,804 B2
(45) Date of Patent: Dec. 13, 2011

(54) TRANSMITTING APPARATUS, RECEIVING APPARATUS AND TRANSMITTING/RECEIVING SYSTEM FOR DIGITAL DATA

(75) Inventors: Sinya Suzuki, Shizuoka (JP); Shosuke Sekikawa, Shizuoka (JP); Yoshihito Shiga, Shizuoka (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 12/060,704

(22) Filed: Apr. 1, 2008

(65) Prior Publication Data

US 2008/0247485 A1  Oct. 9, 2008

(30) Foreign Application Priority Data

Apr. 3, 2007  (JP) ................ P2007-097595

(51) Int. Cl.
*H03K 9/00* (2006.01)

(52) U.S. Cl. ......... 375/316; 375/146; 375/147; 375/295

(58) Field of Classification Search ............... 375/295, 375/316; 348/512, 518, 620, 665; 386/200, 386/201, 230, 326; 709/200, 211, 229
See application file for complete search history.

(56) References Cited

U.S. PATENT DOCUMENTS

| | | | |
|---|---|---|---|
| 6,778,493 B1* | 8/2004 | Ishii | 370/229 |
| 7,742,916 B2* | 6/2010 | Barriac et al. | 704/217 |
| 2006/0012710 A1* | 1/2006 | Sasaki | 348/515 |
| 2007/0183402 A1* | 8/2007 | Bennett et al. | 370/352 |
| 2009/0024395 A1* | 1/2009 | Banba | 704/500 |

FOREIGN PATENT DOCUMENTS

| | | |
|---|---|---|
| JP | 2004 312281 | 11/2004 |
| JP | 2005-303826 | 10/2005 |
| WO | WO 2005069277 | * 7/2005 |

* cited by examiner

*Primary Examiner* — Dhaval Patel
(74) *Attorney, Agent, or Firm* — Frommer Lawrence & Haug LLP; William S. Frommer; Thomas F. Presson (57) ABSTRACT

A transmitting apparatus for transmitting digital data includes storage unit for storing a digital data delay due to digital processing inside the transmitting apparatus; and delay information transmitting unit for transmitting delay information indicating the delay stored in the storage unit.

16 Claims, 11 Drawing Sheets

TRANSMITTING APPARATUS, RECEIVING APPARATUS AND TRANSMITTING/RECEIVING SYSTEM FOR DIGITAL DATA

CROSS REFERENCES TO RELATED APPLICATIONS

The present invention contains subject matter related to Japanese Patent Application JP 2007-097595 filed in the Japanese Patent Office on Apr. 3, 2007, the entire contents of which being incorporated herein by reference.

BACKGROUND OF THE INVENTION

1. Field of the Invention

The present invention relates to a transmitting apparatus, a receiving apparatus, and a transmitting/receiving system for digital data, such as a digital audio signal.

2. Description of the Related Art

Recently, a large number of digital appliances, such as digital wireless microphones, digital audio mixers, and digital camcorders are used to produce audio-visual productions. In such digital appliances, digital processing is carried out to record and edit audio and images.

In addition to real-time processing in the same way as analog processing carried out inside an existing analog appliance, such digital processing includes processing that incurs a delay, such as digital filtering and digital compression.

For example, when, during ENG (Electronic News Gathering) or studio recording, a plurality of audio signals(in the case of music, vocal, guitar, and bass tracks for example) are inputted into a digital audio mixer or a digital camcorder using individual digital wireless microphones, the delay before input into the digital audio mixer or digital camcorder will differ between the audio signals, due to differences in the internal circuit specifications and/or firmware of the digital wireless microphones that transfer the audio signals.

Accordingly, before the different audio signals (or alternatively the different audio signals and images picked up by a digital camcorder) are merged into a single production, it may be necessary to adjust the delays of the different audio signals inputted into the digital audio mixer or digital camcorder.

However, since the delay times of individual digital wireless microphones are not known in an existing system, the recording engineer or editor has had to measure the delays of the different audio signals and appropriately adjust the respective delays of the audio signals. This means that adjusting the delays takes a lot of time and effort.

Japanese Unexamined Patent Application Publication No. 2004-312281 discloses a technology for transmitting digital image data that is appended with attribute information (such as image pickup time/date and scene number) and information on image pickup conditions (such as the camera in use and shutter speed) as metadata and displaying the received metadata superimposed on images. However, a technology that can transmit and receive information that is useful in adjusting the delays of digital data is yet to be disclosed.

SUMMARY OF THE INVENTION

Embodiments of the present invention attempt to facilitate checking the delays of digital data when transmitting and receiving digital data in a digital data transmitting/receiving system, such as a digital wireless microphone.

A transmitting apparatus for transmitting digital data according to an embodiment of the present invention includes a storage unit for storing a digital data delay due to digital processing inside the transmitting apparatus and a delay information transmitting unit for transmitting delay information indicating the delay stored in the storage unit.

A digital data delay due to digital processing inside the transmitting apparatus is stored in the transmitting apparatus and delay information indicating the stored delay is transmitted from the transmitting apparatus.

Consequently, if a receiving apparatus that receives digital data transmitted from the transmitting apparatus can obtain the delay information, it is possible to easily check the digital data delay in the transmitting apparatus.

A receiving apparatus for receiving digital data transmitted from a transmitting apparatus according to an embodiment of the present invention includes a storage unit for storing a first delay for digital data due to digital processing inside the receiving apparatus, a delay information obtaining unit for obtaining delay information indicating a second delay for digital data that are transmitted from the transmitting apparatus. The receiving apparatus further includes a delay information generating unit for generating delay information indicating a total delay obtained from a total of the first delay stored in the storage unit and the second delay indicated by the delay information obtained by the delay information obtaining unit.

In the receiving apparatus, delay information, which shows a digital data delay, transmitted from a transmitting apparatus is obtained. In this receiving apparatus, a digital data delay due to digital processing inside the receiving apparatus is stored and delay information indicating a delay obtained from a total of the delay stored in the receiving apparatus and the delay indicated by the delay information transmitted from the transmitting apparatus is generated.

Consequently, by using the delay information generated by the receiving apparatus, it is possible to easily confirm the total delay for digital data in the transmitting apparatus and the receiving apparatus.

A digital data transmitting/receiving system according to an embodiment of the present invention includes a transmitting apparatus for transmitting digital data and a receiving apparatus for receiving the digital data transmitted from the transmitting apparatus. In the digital data transmitting/receiving system according to an embodiment, the transmitting apparatus includes a first storage unit for storing a first digital data delay due to digital processing inside the transmitting apparatus, and a delay information transmitting unit for transmitting delay information indicating the first delay stored in the first storage unit. Further, in the digital data transmitting/receiving system according to an embodiment, the receiving apparatus includes a second storage unit for storing a second delay for digital data due to digital processing inside the receiving apparatus, a delay information obtaining unit for obtaining the delay information transmitted from the transmitting apparatus, and a delay information generating unit for generating delay information indicating a total delay obtained from a total of the second delay stored in the second storage unit and the first delay indicated by the delay information obtaining unit.

The digital data transmitting/receiving system includes the transmitting apparatus and the receiving apparatus according to an embodiment of the present invention described above, and it is possible to easily check the delay for digital data of the entire digital data transmitting/receiving system by using the delay information generated by the receiving apparatus.

According to an embodiment of the present invention, it is possible to easily check a digital data delay when digital data is transmitted and received in a digital data transmitting/receiving system.

DESCRIPTION OF THE PREFERRED EMBODIMENTS

Specific embodiments of the present invention will now be described in detail with reference to the attached drawings. Note that an example where the embodiment of the present invention has been applied to a digital wireless microphone is described below.

Figure 1A:
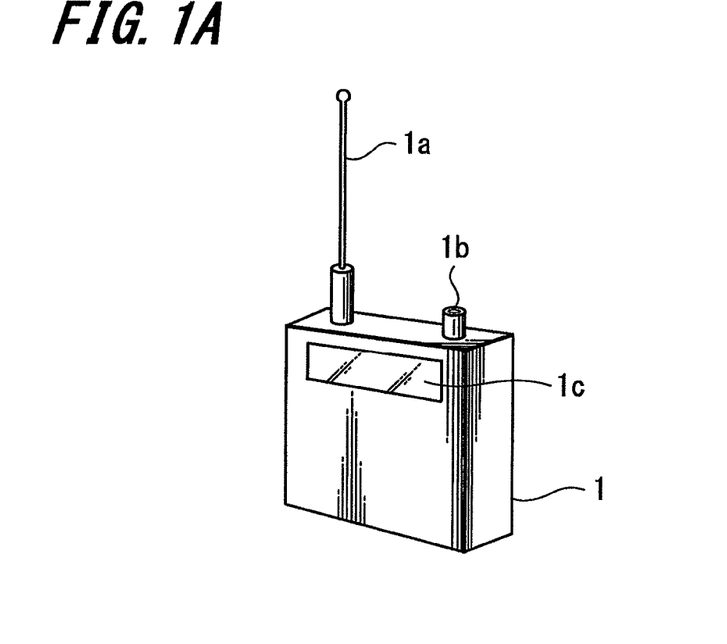
FIGS. 1A and 1B are views showing the appearance of a wireless microphone to which an embodiment of the present invention has been applied.
Figure 1B:
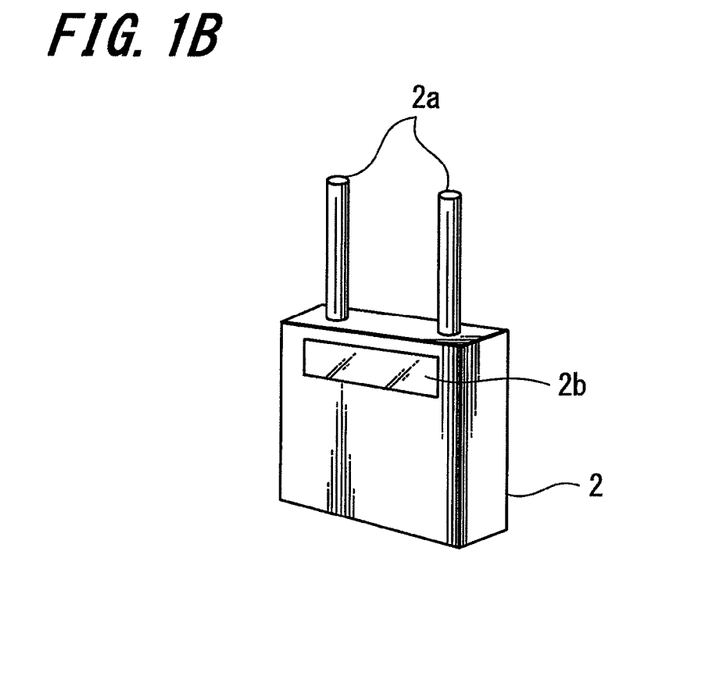

FIGS. 1A and 1B are views showing the appearance of a digital wireless microphone (hereinafter simply "wireless microphone") to which an embodiment of the present invention has been applied. Out of such drawings, FIG. 1A shows a wireless microphone transmitter (hereinafter simply transmitter) 1 as an apparatus for transmitting audio. A transmission antenna 1a, a microphone input terminal 1b, and a display unit 1c including a liquid crystal display are provided on the surface of the transmitter 1. The transmitter 1 is attached to a waist belt or the like, and a microphone (such as a pin microphone) is connected by a cable to the microphone input terminal 1b.

FIG. 1B shows a wireless microphone receiver (hereinafter simply "receiver") 2 as an apparatus for receiving audio. A reception antenna 2a and a display unit 2b including a liquid crystal display are provided on the surface of the receiver 2. Also, although not shown in the drawings, a digital audio output terminal and an audio output terminal (for monitoring purposes) are provided on the surface of the receiver 2. The receiver 2 is a portable receiver.

Figure 2:
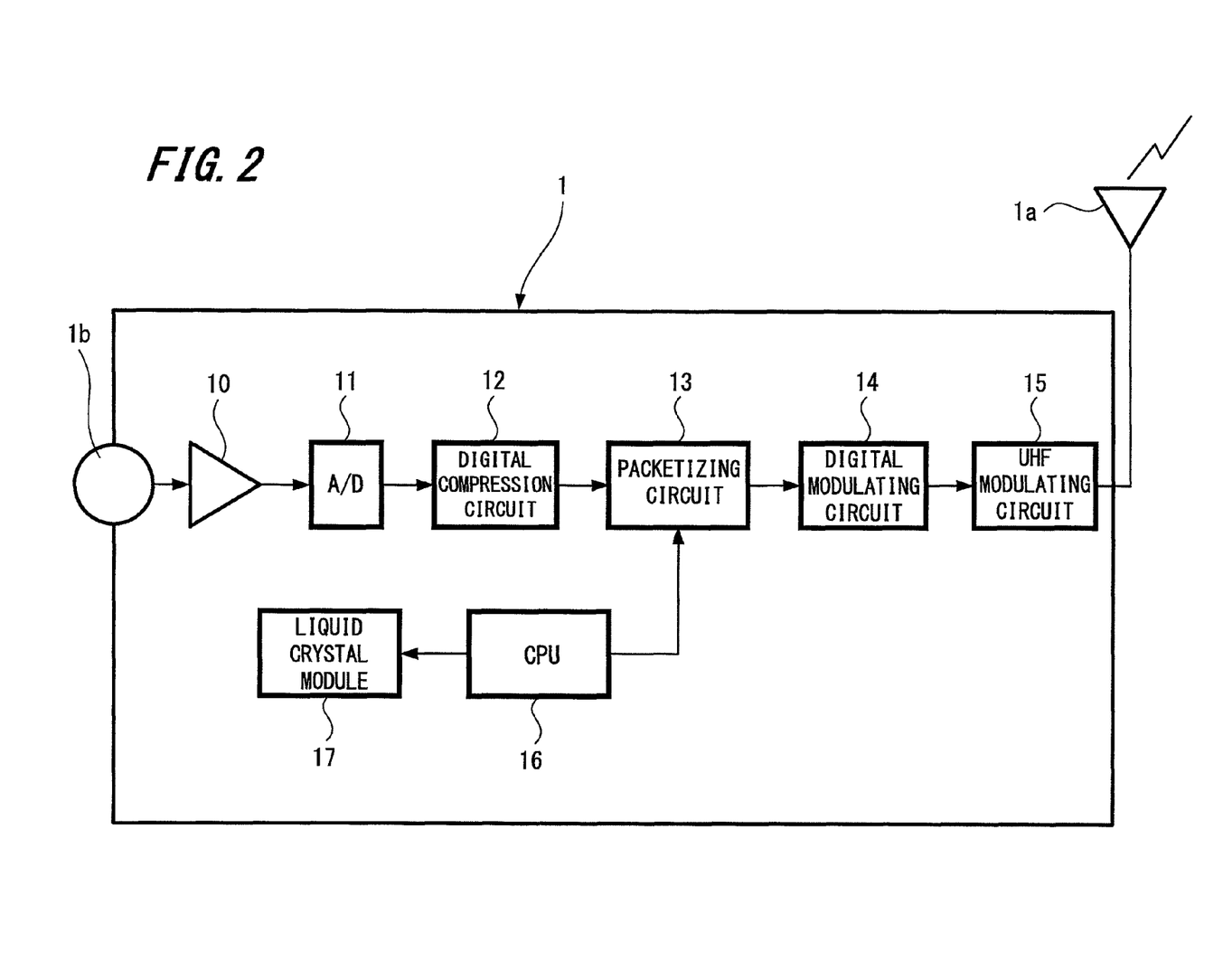
FIG. 2 is a block diagram showing a configuration example of a transmitter shown in FIG. 1.

FIG. 2 is a block diagram showing a configuration example of the transmitter 1. The transmitter 1 includes an amp 10 that amplifies the input audio signal from a microphone (not shown) connected to the microphone input terminal 1b (see FIG. 1A) and an A/D converter 11 for carrying out analog/digital conversion on the audio signal amplified by the amp 10.

The transmitter 1 also includes a digital compression circuit 12 that compresses the data size of the digital audio signal outputted from the A/D converter 11 and a packetizing circuit 13 that packetizes the digital audio signal compressed by the digital compression circuit 12. The packetizing circuit 13 is formed by an FPGA.

The transmitter 1 also includes a digital modulating circuit 14, a UHF modulating circuit 15, and the transmission antenna 1a (see FIG. 1A) for transmitting radio waves that have been modulated using the packet signal outputted from the packetizing circuit 13.

The transmitter 1 further includes a CPU 16 for internal control of the transmitter 1 and a liquid crystal module 17 that constructs the display unit 1c (FIG. 1A).

Digital processing by the A/D converter 11, digital processing by the digital compression circuit 12, digital processing by the packetizing circuit 13, and digital processing by the digital modulating circuit 14 all incur a delay. The lengths of the delays due to such circuits will change according to differences in the circuit specifications and firmware, but will be constant when the circuit specifications and firmware are the same.

The total delay due to the A/D converter 11, the digital compression circuit 12, the packetizing circuit 13, and the digital modulating circuit 14 (that is, the delay for the digital audio signal due to digital processing by the transmitter 1) is stored in advance in a memory inside the CPU 16.

Figure 3:
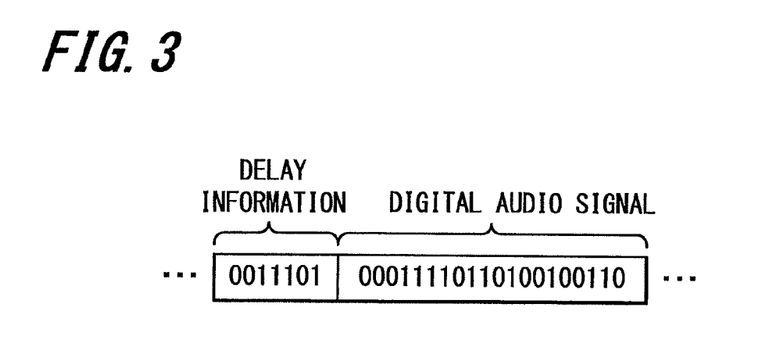
FIG. 3 is a diagram showing an example of how delay information is appended by a packetizing circuit shown in FIG. 2.

A program that generates a packet signal appended with delay information indicating the delay stored in the memory is also stored in the CPU 16 as a program for controlling the packetizing circuit 13. FIG. 3 is a diagram showing an example of how delay information is appended by the packetizing circuit 13 according to such control. In this example, since a delay of 2.9 ms is stored in the memory of the CPU 16 (an example where the delay due to the A/D converter 11 is 0.5 ms, the delay due to the digital compression circuit 12 is 1.0 ms, the delay due to the packetizing circuit 13 is 1.0 ms, and the delay due to the digital modulating circuit 14 is 0.4 ms), delay information indicating 2.9 ms is appended.

Figure 4:
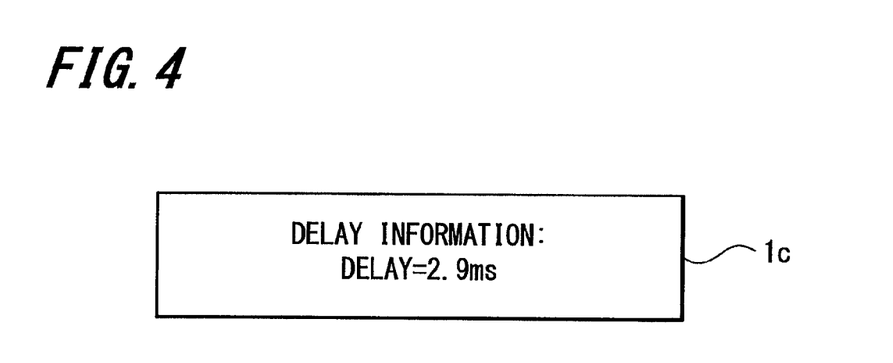
FIG. 4 is a diagram showing an example of how the delay information is displayed by a display unit of the transmitter.

A program for displaying the delay stored in the memory of the CPU 16 is stored in the CPU 16 as a program for controlling a liquid crystal module 17. FIG. 4 is a diagram showing how the delay is displayed on the display unit 1c (see FIG. 1A) by such control for an example where 2.9 ms is stored as the delay time in the same way as in FIG. 3.

Figure 5:
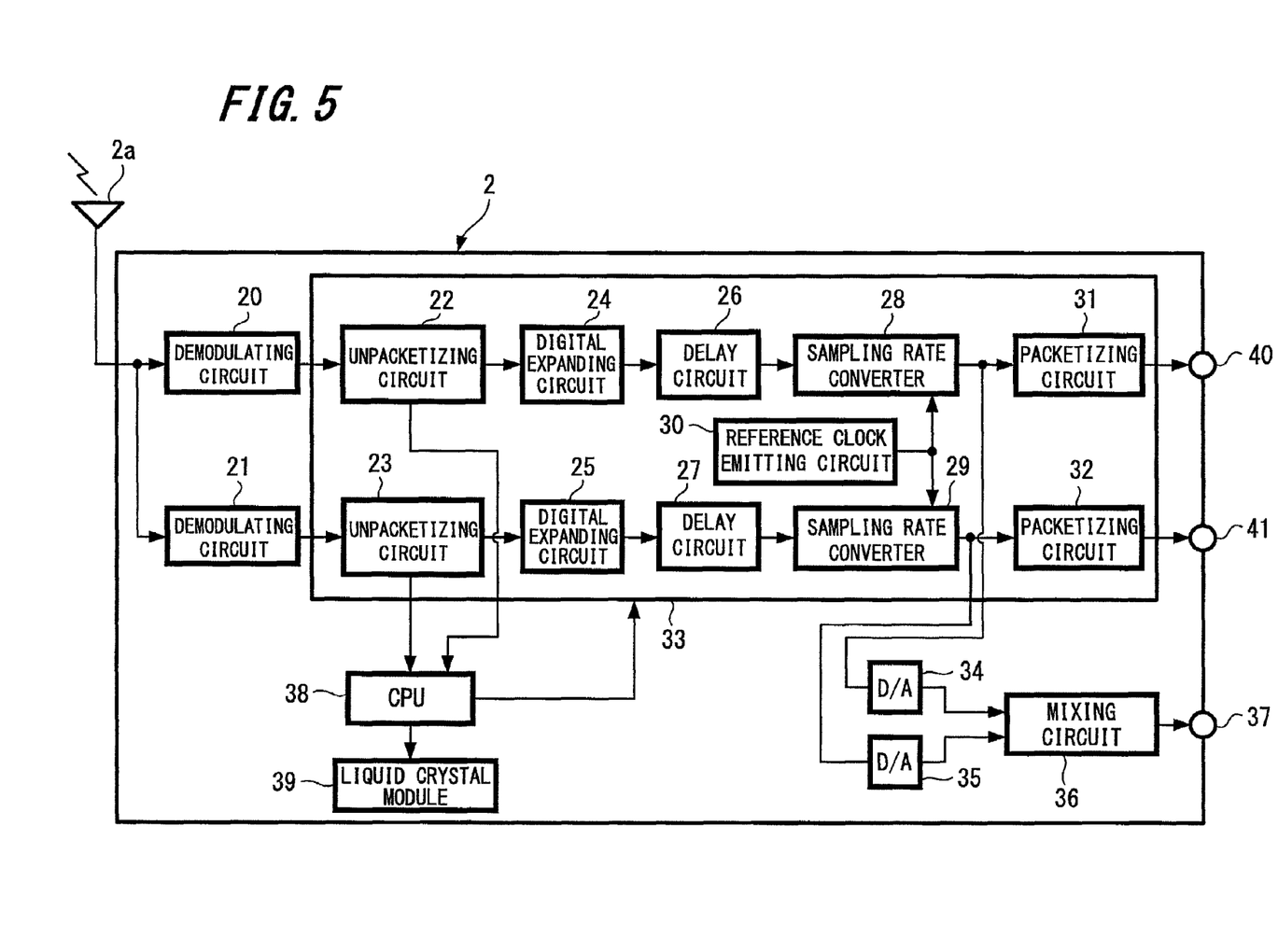
FIG. 5 is a block diagram showing a configuration example of a receiver shown in FIG. 1.

FIG. 5 is a block diagram showing a configuration example of the receiver 2. The receiver 2 is capable of receiving digital audio signals on two channels from two transmitters 1 and has two systematic demodulating circuits 20, 21 connected to the reception antenna 2a (see FIG. 1B).

The receiver 2 includes unpacketizing circuits 22, 23 that extract the respective digital audio signals and delay information described earlier from the packet signals demodulated by the demodulating circuits 20, 21.

The digital audio signals extracted by the unpacketizing circuits 22, 23 are respectively expanded by digital expanding circuits 24, 25 and are sent to the delay circuits 26, 27 which each have an adjustable delay.

The digital audio signals outputted from the delay circuits 26, 27 are sent via sampling rate converters 28, 29 (i.e., circuits that convert the sampling rate of the digital audio signals based on a reference clock from a reference clock emitting circuit 30 inside the receiver 2 to packetizing circuits 31, 32. Here, the paths from the unpacketizing circuits 22, 23 to the packetizing circuits 31, 32 are constructed on an FPGA 33.

The digital audio signals outputted from the sampling rate converters 28, 29 are converted to analog audio signals by D/A converters 34, 35 and are mixed (subjected to an adding process) by a mixing circuit 36. The mixed analog audio signal produced by the mixing circuit 36 is outputted from an audio output terminal 37 for monitoring purposes.

The delay information extracted by the unpacketizing circuits 22, 23 is sent to the CPU 38 that carries out internal control of the receiver 2.

The CPU 38 stores a program that compares the delay indicated by the delay information from the unpacketizing circuit 22 with the delay indicated by the delay information from the unpacketizing circuit 23 and adjusts, when there is a difference between the two, the delay of a delay circuit, out of the delay circuits 26, 27, corresponding to the unpacketizing circuit sent the shorter of the delays by the difference between the two delays (and sets the delay of the other delay circuit at zero).

As a specific example of the processing by such program, when the delay indicated by the delay information from the D/A converter 22 is 2.9 ms and the delay indicated by the delay information from the D/A converter 23 is 2.3 ms, the delay of the delay circuit 27 corresponding to the unpacketizing circuit 23 is set at 0.6 ms.

According to this processing, the mixing circuit 36 mixes two channels of analog audio signals with matching delays. FIGS. 6A to FIG. 7B show an adding process for a 1 kHz audio signal and a 2.5 kHz audio signal as one example of an adding process for audio signals on two channels.

Figure 6A:
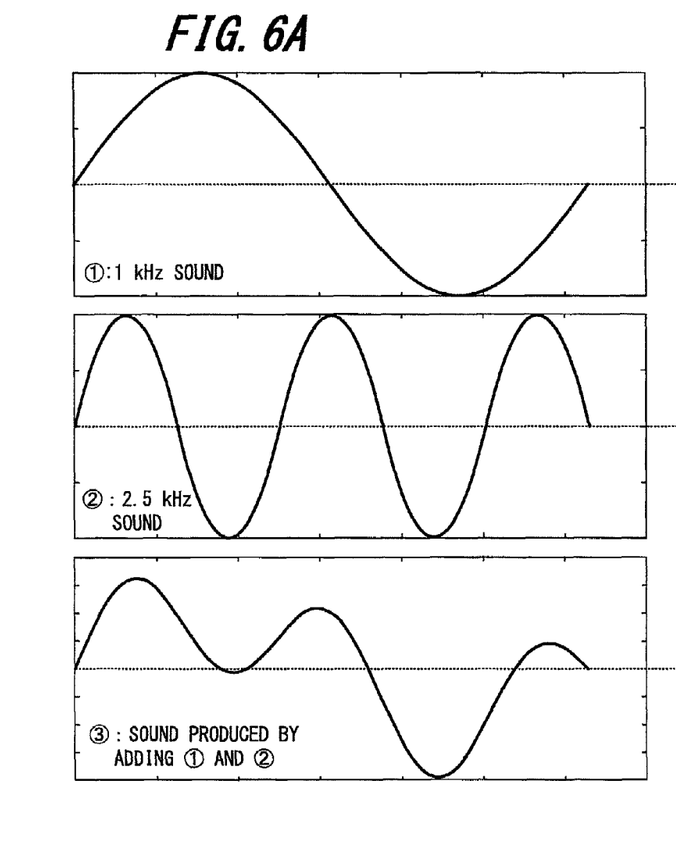
FIGS. 6A and 6B are diagrams showing examples of how an adding process is carried out on two audio signals.
Figure 6B:
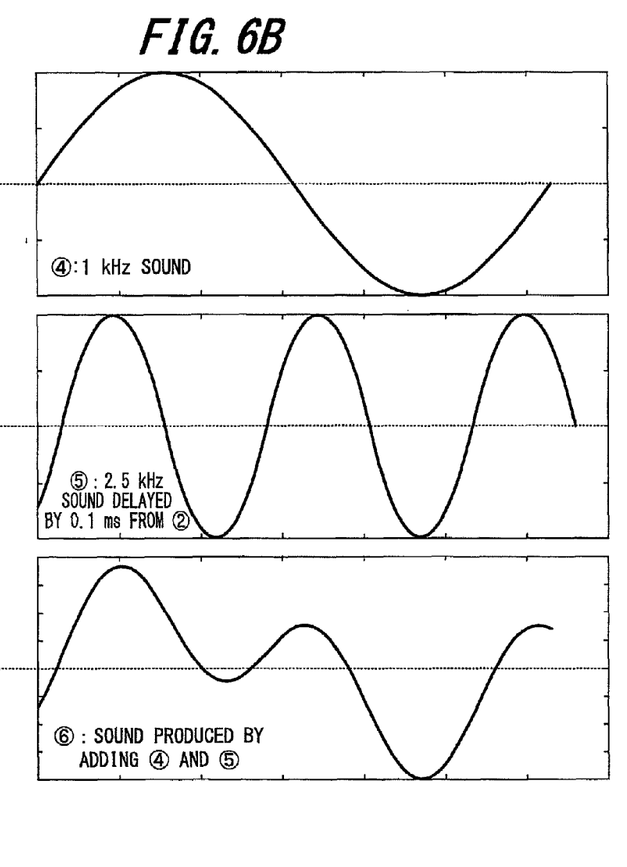

Here, FIG. 6A shows an adding process in a state where neither of the 1 kHz, 2.5 kHz audio signals is delayed and FIG. 6B shows an adding process in a state where only the 2.5 kHz audio signal is delayed by 0.1 ms. When only one of the audio signals is delayed, a different result is obtained to an adding process carried out when neither audio signal is delayed, thereby showing that the audio signals are not properly mixed.

Figure 7A:
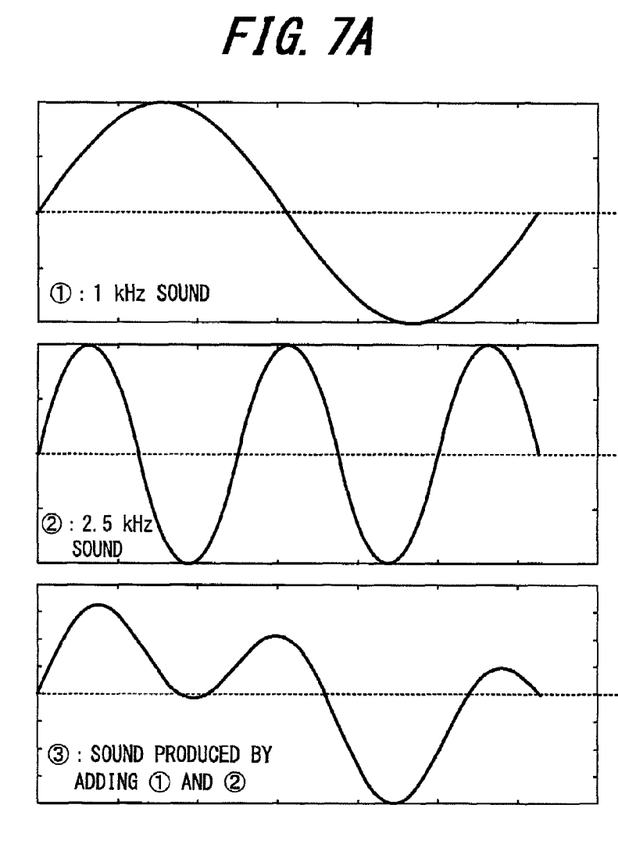
FIGS. 7A and 7B are diagrams showing examples of how an adding process is carried out on two audio signals.
Figure 7B:
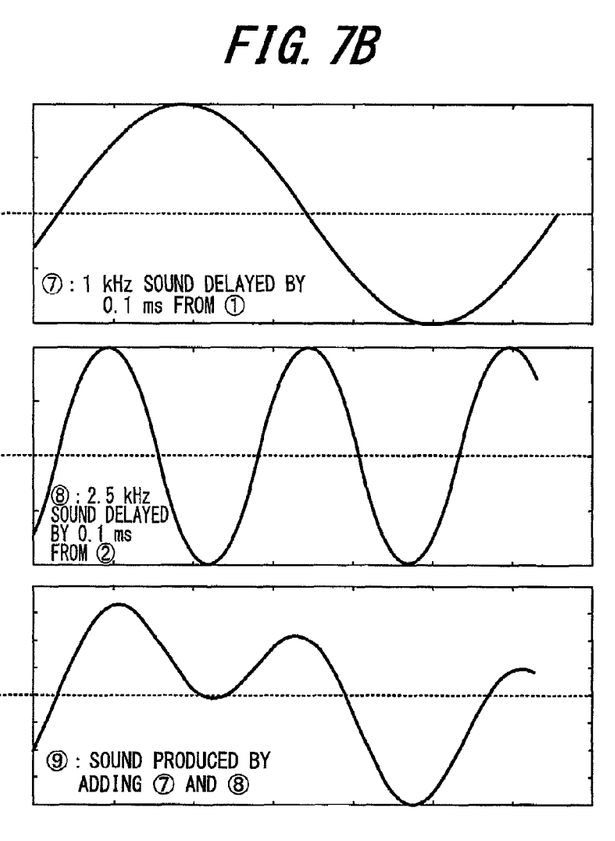

On the other hand, FIG. 7A shows an adding process in a state where neither of the 1 kHz, 2.5 kHz audio signals is delayed and FIG. 7B shows an adding process in a state where both the 1 kHz and 2.5 kHz audio signals are delayed by 0.1 ms. By matching the delays of the two audio signals, the same result is obtained to an adding process carried out when neither of the audio signals are delayed, thereby showing that the audio signals can be properly mixed.

Accordingly, since two analog audio signals can be correctly mixed by the mixing circuit 36 by setting the delays of the delay circuits 26, 27 using the CPU 38, it is possible to monitor correctly mixed audio using an earphone or the like connected to the audio output terminal 37 for monitoring purposes.

The digital processing by the demodulating circuits 20, 21, the digital processing by the unpacketizing circuits 22, 23, the digital processing by the digital expanding circuits 24, 25, the digital processing by the sampling rate converters 28, 29, and the digital processing by the packetizing circuits 31, 32 all incur delays. The lengths of the delays by such circuits will change according to differences in circuit specification and firmware, but will be constant when the circuit specification and firmware are the same.

The total delay due to the demodulating circuits 20, 21, the unpacketizing circuits 22, 23, the digital expanding circuits 24, 25, the sampling rate converters 28, 29, and the packetizing circuits 31, 32 (that is, the delay for a digital audio signal processed by the receiver 2) is stored in advance in a memory inside the CPU 38.

A program that generates packet signals appended with delay information indicating a delay obtained from the total of the delay stored in the memory and the longer one of the delays indicated by the delay information extracted by the unpacketizing circuits 22, 23 is stored in the CPU 38 as a program that controls the packetizing circuits 31, 32.

Figure 8:
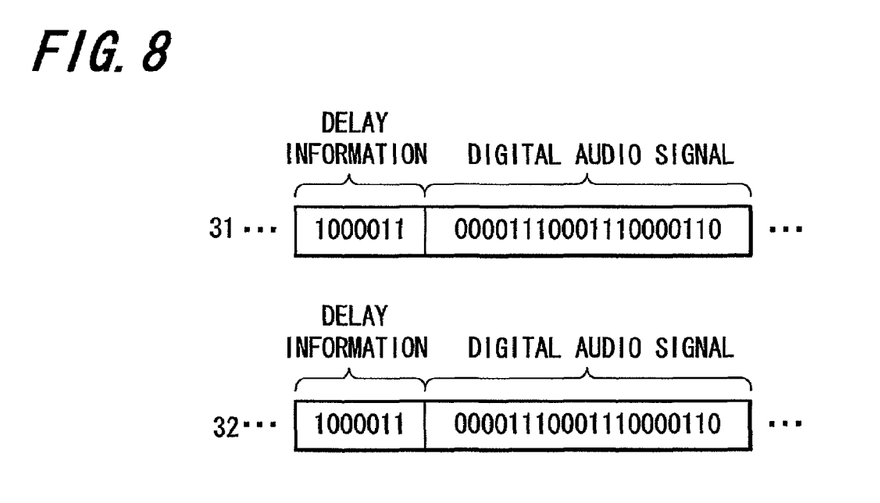
FIG. 8 is a diagram showing an example of how delay information is appended by packetizing circuits shown in FIG. 5.

FIG. 8 shows an example of how delay information is appended by the packetizing circuits 31, 32 according to such control. In this example, as described earlier the delays indicated by the delay information from the unpacketizing circuits 22, 23 are respectively 2.9 ms and 2.3 ms and a delay of 3.8 ms is stored inside the CPU 16 (for example, the delay due to the demodulating circuits 20, 21 is 0.3 ms, the delay due to the unpacketizing circuits 22, 23 is 1.0 ms, the delay due to the digital expanding circuits 24, 25 is 0.8 ms, the delay due to the sampling rate converters 28, 29 is 0.7 ms, and the delay due to the packetizing circuits 31, 32 is 1.0 ms), and therefore delay information indicating a delay of 6.7 ms obtained from the total of 2.9 ms and 3.8 ms is appended.

Figure 9:
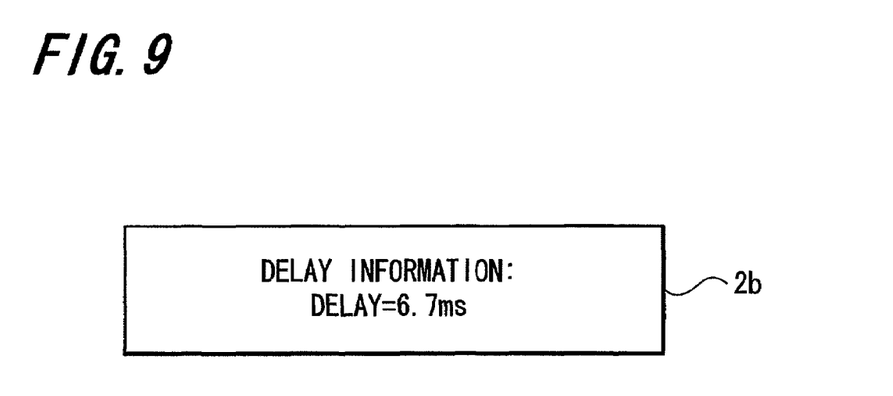
FIG. 9 is a diagram showing an example of how delay information is displayed by the display unit of the receiver.

As a program that controls the liquid crystal module 39 that constructs the display unit 2b (see FIG. 1B), the CPU 38 stores a program for displaying a delay obtained from the total of the delay stored in the memory inside the CPU 38 and the longer one of the delays indicated by the delay information extracted by the unpacketizing circuits 22, 23. FIG. 9 is a diagram showing one example of the display of a delay on the display unit 2b by such control for the example where the total delay is 6.7 ms in the same way as in FIG. 8.

As shown in FIG. 5, the packet signals outputted from the packetizing circuits 31, 32 are outputted from the respective digital audio output terminals 40, 41.

In this wireless microphone, the transmitter 1 stores the delay for a digital audio signal due to digital processing inside the transmitter 1, and delay information indicating the stored delay is appended to the digital audio signal when the digital audio signal is transmitted.

In the receiver 2, the delay information is extracted from the digital audio signal transmitted from the transmitter 1 and the delay for data in the transmitter 1 is checked.

Also in the receiver 2, the delay for a digital audio signal due to digital processing inside the receiver 2 is stored, and delay information indicating a delay obtained from the total of the delay stored in the receiver 2 and the delay indicated by the delay information transmitted from the transmitter 1 is generated.

After this, the delay information indicating this total delay is appended to a digital audio signal that is outputted from the receiver 2.

Accordingly, if a digital appliance into which the digital audio signal is inputted from the receiver 2 is capable of a process that extracts such delay information from the inputted digital audio signal, it will be possible to easily check the total delay for a digital audio signal by the wireless microphone.

In addition, since the total delay is displayed on the display unit 2b of the receiver 2 as shown in FIG. 9 for example, it will be possible to easily check the total delay for a digital audio signal by the wireless microphone by simply looking at the display of the display unit 2b.

In addition, since processing that matches the delay time of the digital audio signals on two channels is carried out inside the receiver 2, for a digital appliance into which digital audio signals are inputted from the receiver 2, it may no longer be necessary to adjust the delays of the digital audio signals on two channels inputted from a single receiver 2. It is therefore sufficient to adjust the delays of digital audio signals only when the digital audio signals have been inputted from a plurality of receivers 2.

Also, since the delay due to the transmitter 1 is also displayed on the display unit 1c of the transmitter 1 as shown in FIG. 4, even when digital audio signals are transmitted from two transmitters 1 and received by a two-channel-capable receiver aside from the receiver 2, by looking at the display of the display unit 1c of each transmitter 1, it will be possible to easily check the delays of the digital audio signals on each channel.

Figure 10:
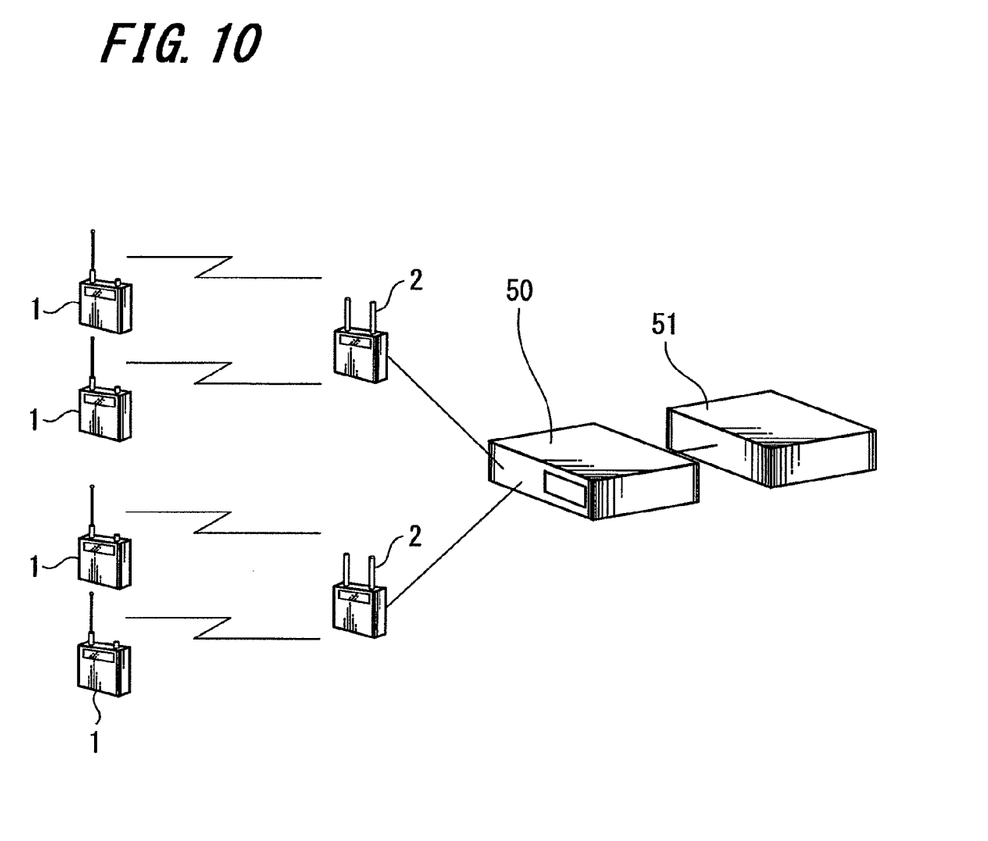
FIG. 10 is a diagram showing one example of a system using a wireless microphone to which an embodiment of the present invention is applied.
Figure 11:
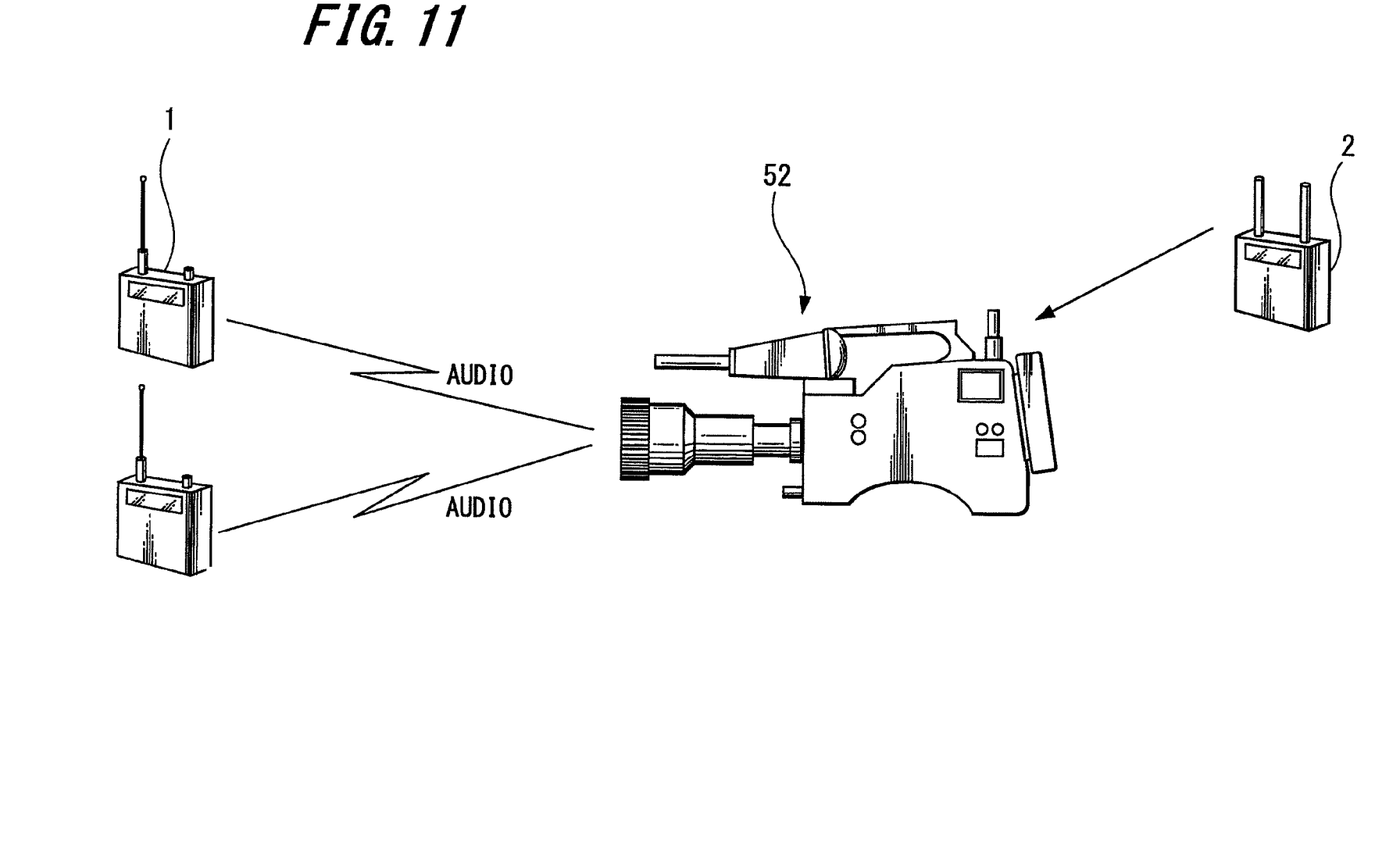
FIG. 11 is a diagram showing another example of a system using a wireless microphone to which an embodiment of the present invention is applied.

FIGS. 10 and 11 show example systems in which such wireless microphone is used. FIG. 10 shows a system where two wireless microphones, each of which includes two transmitters 1 and one receiver 2, are used to input four channels of audio into a digital audio mixer 50 and audio that has been mixed by the digital audio mixer 50 is recorded by an audio recorder 51.

The transmitters 1 and the receivers 2 may respectively include differences in the circuit specification and firmware insofar as the transmitters 1 and the receivers 2 are formed as shown in FIGS. 2 and 5 (i.e., the delays due to the respective specifications and firmware will be stored in the memory of the CPU 16 of each transmitter 1 and in the memory inside the CPU 38 of each receiver 2).

If music is being recorded, for example, each transmitter 1 will be used by a vocalist or a musician.

If the digital audio mixer 50 includes a function that extracts the delay information appended to the input digital audio signals from the receivers 2 and a function that adjusts the delays of the input digital audio signals from the receivers 2 based on the delay information (i.e., a function that matches the delays using delay circuits of which delays can be adjusted in the same way as the delay circuits 26, 27 shown in FIG. 5), it will be possible to automatically adjust the delays for the respective audio signals and therefore correctly mix the audio signals.

Even if the digital audio mixer 50 has no such a function, the recording engineer who operates the digital audio mixer 50 will be able to easily check the delay for each audio signal by looking at the displays of the delays on the respective receivers 2. Accordingly, it will be possible to adjust the delay for each audio signal without measuring the delays of the respective audio signals as carried out in the related art.

FIG. 11 shows a system where one wireless microphone including two transmitters 1 and one receiver 2 is used and audio signals inputted into a digital camcorder (a camcorder integrated with a recorder such as a VTR or optical disk apparatus) 52 from the receiver 2 attached to a slot of the digital camcorder 52 are recorded in the digital camcorder 52 together with images picked up by the digital camcorder 52.

Transmitters 1 may include differences in the circuit specification and firmware insofar as the transmitters 1 are formed as shown in FIG. 2 or in FIG. 5 (i.e., the delays due to the respective specifications and firmware will be stored in the memory in the CPU 16 of each transmitter 1).

For example, when recording a talk show, each transmitter 1 is used by one of the two participants.

Since the two channels of digital audio signals inputted into the digital camcorder 52 from the receiver 2 have matching delays, there may be no need to adjust the delays of the two channels of digital audio signals in the digital camcorder 52.

If a function for extracting the delay information appended to the input digital audio signals from the receiver 2 and a function for adjusting the delays between audio and images based on such delay information and information on the delay of a digital image signal due to digital processing inside the digital camcorder 52 are provided in the digital camcorder 52, it will be possible to automatically record the audio and images with adjusted delays.

Figure 12:
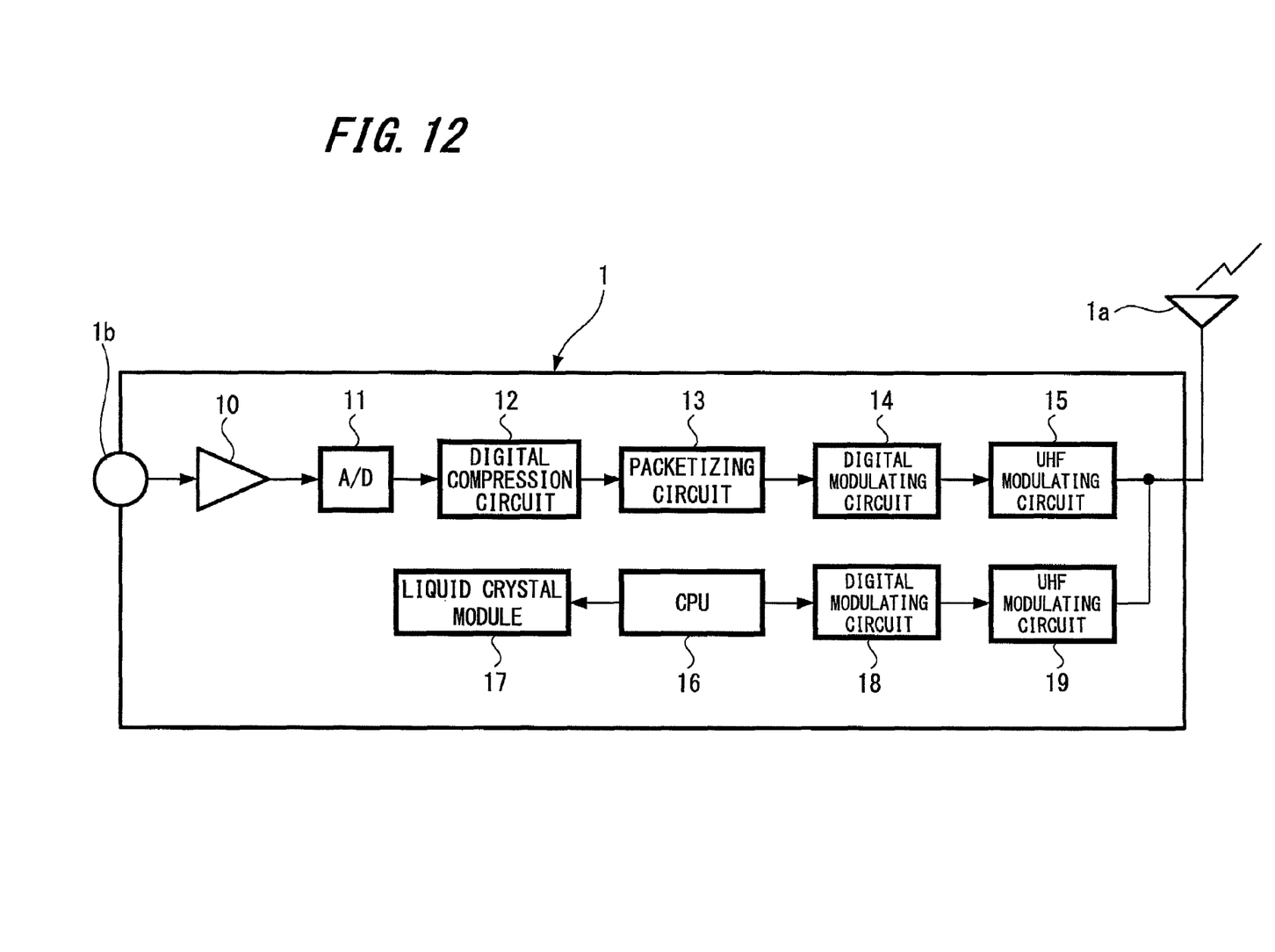
FIG. 12 is a block diagram showing another configuration example of the transmitter shown in FIG. 1.
Figure 13:
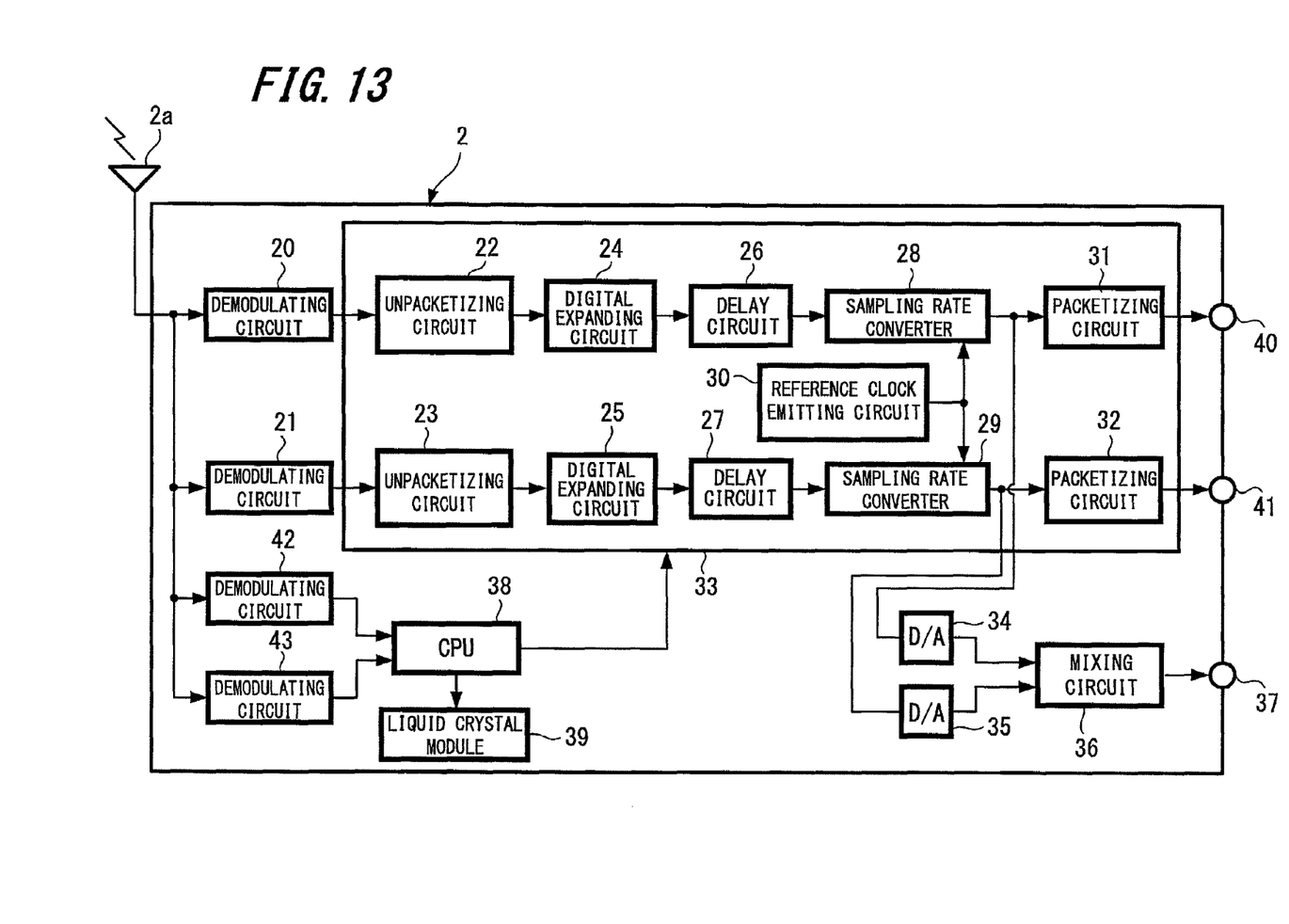
FIG. 13 is a block diagram showing another configuration example of the receiver shown in FIG. 1.

Note that in the configuration examples of the transmitter 1 and the receiver 2 shown in FIG. 2 and FIG. 5, the delay information is transmitted from the transmitter 1 having been appended to a digital audio signal. However, as another example, the delay information may be transmitted from the transmitter 1 as radio waves of a different frequency band to the digital audio signal. FIG. 12 and FIG. 13 are block diagrams showing examples of such constructions, with parts that are the same as in the constructions shown in FIG. 2 and FIG. 5 having been assigned the same reference numerals and duplicated description thereof having been omitted.

As shown in FIG. 12, the transmitter 1 includes a digital modulating circuit 18 and a UHF modulating circuit 19 for transmitting a subcarrier (for example, 2.4 GHz when the main carrier is 800 MHz) of a different frequency band to the main carrier which is used to transmit radio waves modulated by the digital modulating circuit 14.

Here, instead of appending delay information indicating the delay stored in the memory inside the CPU 16 to the digital audio signal in the packetizing circuit 13, the CPU 16 sends the delay information to the digital modulating circuit 18 to have the information transmitted from the transmission antenna 1a as a subcarrier.

As shown in FIG. 13, in addition to the demodulating circuits 20, 21 shown in FIG. 5, the receiver 2 includes demodulating circuits 42, 43 for demodulating the subcarriers from two transmitters 1. The delay information demodulated by the demodulating circuits 42, 43 is sent to the CPU 38.

Also, in the example described above, the embodiment of the present invention is applied to the receiver 2 capable of receiving digital audio signals on two channels from two transmitters 1. However, the embodiment may be applied to a receiver capable of receiving a digital audio signal from only one transmitter 1 or a receiver 2 capable of receiving digital audio signals from three or more transmitters 1.

When the embodiment of the present invention is applied to a receiver capable of receiving a digital audio signal from only one transmitter 1, delay circuits such as the delay circuits 26, 27 shown in FIG. 5 may not be necessary, and it is sufficient to calculate the total of the delay indicated by the delay information transmitted from the transmitter 1 and the delay stored in the memory inside the CPU 38.

When the embodiment of the present invention is applied to a receiver capable of receiving digital audio signals from three or more transmitters 1, delay circuits such as the delay circuits 26, 27 shown in FIG. 5 are used to delay the digital audio signals aside from the digital audio signal with the longest delay so as to match the longest delay and the total of the longest delay indicated by the delay information transmitted from the transmitters 1 and the delay stored in the memory inside the CPU 38 is calculated.

Also, the appearances of the transmitter 1 and the receiver 2 shown in FIGS. 1A and 1B are mere examples and the embodiment of the present invention may be applied to transmitters and receivers of a suitable size and shape aside from those shown in FIGS. 1A and 1B (for example, a hand-microphone-type transmitter where a microphone and a transmitter are integrated, and a non-portable receiver).

Also, in the example described above, the embodiment of the present invention is applied to a wireless microphone.

However, the embodiment may be applied to a system where a digital audio signal is transmitted and received using wires, where a digital audio signal appended with delay information is transmitted on one cable or where delay information is transmitted on a separate cable to a digital audio signal.

The embodiment of the present invention may also be adapted to a transmitting apparatus, a receiving apparatus, or transmitting/receiving system for digital data aside from a digital audio signal.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting apparatus for transmitting digital data comprising:
    storage means for storing a delay for digital data due to digital processing inside the transmitting apparatus; and
    delay information transmitting means for transmitting delay information indicating the delay stored in the storage means,
    wherein the transmitting apparatus transmits the digital data to a receiving apparatus, the receiving apparatus comprising:
    storage means for storing a first delay for digital data due to digital processing inside the receiving apparatus;
    delay information obtaining means for obtaining the delay information, which shows a second delay for the digital data, transmitted from the transmitting apparatus; and
    delay information generating means for generating delay information indicating a total delay obtained from a total of the first delay stored in the storage means and the second delay indicated by the delay information obtained by the delay information obtaining means,
        wherein the receiving apparatus receives digital data transmitted from a plurality of transmitting apparatuses,
        wherein the delay information obtaining means obtains respective delay information transmitted from the plurality of transmitting apparatuses,
        wherein the receiving apparatus further includes delay means for delaying, based on the delay information obtained by the delay information obtaining means, digital data aside from digital data with a longest delay of the digital data received from the plurality of transmitting apparatuses so as to match the longest delay, and
        wherein the delay information generating means calculates a total of the first delay stored in the storage means and the longest delay of delays indicated by the delay information obtained by the delay information obtaining means.

2. A transmitting apparatus according to claim 1, further comprising:
    display means; and
    control means for causing the display means to display the delay stored in the storage means.

3. A transmitting apparatus according to claim 2, wherein the delay information transmitting means includes an appending circuit that appends the digital data transmitted from the transmitting apparatus with the delay information.

4. A transmitting apparatus according to claim 1, wherein the transmitting apparatus is an audio transmitting apparatus that includes a microphone, an analog/digital converter that carries out analog/digital conversion on an audio signal from the microphone, and modulating/transmitting means for transmitting radio waves modulated by a digital audio signal from the analog/digital converter.

5. A receiving apparatus for receiving digital data transmitted from a transmitting apparatus, comprising:
    storage means for storing a first delay for digital data due to digital processing inside the receiving apparatus;
    delay information obtaining means for obtaining the delay information, which shows a second delay for the digital data, transmitted from the transmitting apparatus; and
    delay information generating means for generating delay information indicating a total delay obtained from a total of the first delay stored in the storage means and the second delay indicated by the delay information obtained by the delay information obtaining means,
    wherein the receiving apparatus receives digital data transmitted from a plurality of transmitting apparatuses,
    wherein the delay information obtaining means obtains respective delay information transmitted from the plurality of transmitting apparatuses,
    wherein the receiving apparatus further includes delay means for delaying, based on the delay information obtained by the delay information obtaining means, digital data aside from digital data with a longest delay of the digital data received from the plurality of transmitting apparatuses so as to match the longest delay, and
    wherein the delay information generating means calculates a total of the first delay stored in the storage means and the longest delay of delays indicated by the delay information obtained by the delay information obtaining means.

6. A receiving apparatus according to claim 5, further comprising:
    display means; and
    processing means for causing the display means to display the total delay calculated by the delay information generating means.

7. A receiving apparatus according to claim 5, further comprising:
    output means for outputting the digital data received from the transmitting apparatus and the delay information generated by the delay information generating means.

8. A receiving apparatus according to claim 5, wherein the delay information obtaining means includes an extracting circuit for extracting the delay information which is appended to the digital data received from the transmitting apparatus, from the digital data.

9. A receiving apparatus according to claim 5, wherein the receiving apparatus is a wireless audio receiving apparatus that includes receiving/demodulating means for receiving radio waves transmitted from a wireless audio transmitting apparatus and demodulating a digital audio signal, and an audio output terminal for outputting the digital audio signal demodulated by the receiving/demodulating means.

10. A digital data transmitting/receiving system comprising:
    a transmitting apparatus for transmitting digital data, and
    a receiving apparatus for receiving the digital data transmitted from the transmitting apparatus, wherein
    the transmitting apparatus includes a first storage unit for storing a first digital data delay due to digital processing inside the transmitting apparatus, and a delay information transmitting unit for transmitting delay information indicating the first delay stored in the first storage unit, and the receiving apparatus includes a second storage unit for storing a second delay for the digital data due to digital processing inside the receiving apparatus, a delay information obtaining unit for obtaining the delay information transmitted from the transmitting apparatus, and a delay information generating unit for generating delay information indicating a total delay obtained from a total of the second delay stored in the second storage unit and the first delay indicated by the delay information obtained by the delay information obtaining unit, wherein the receiving apparatus receives digital data transmitted from a plurality of the transmitting apparatuses, wherein the delay information obtaining unit of the receiving apparatus obtains respective delay information transmitted from the plurality of the transmitting apparatuses, wherein the receiving apparatus further includes a delay unit for delaying, based on the delay information obtained by the delay information obtaining unit, digital data aside from digital data with a longest delay of the digital data received from the plurality of transmitting apparatuses so as to match the longest delay, and wherein the delay information generating unit calculates a total of the second delay stored in the second storage unit and the longest delay of delays indicated by the delay information obtained by the delay information obtaining unit.

11. A digital data transmitting/receiving system according to claim 10, wherein the transmitting apparatus further includes a first display unit, and a control unit for causing the first display unit to display the delay stored in the first storage unit, and the receiving apparatus further includes a second display unit, and a processing unit for causing the second display unit to display the total delay calculated by the delay information generating unit.

12. A digital data transmitting/receiving system according to claim 10, wherein the receiving apparatus further includes an output unit for outputting the digital data received from the transmitting apparatus and the delay information generated by the delay information generating unit.

13. A digital data transmitting/receiving system according to claim 10, wherein the delay information transmitting unit of the transmitting apparatus includes an appending circuit that appends the digital data transmitted from the transmitting apparatus with the delay information, and the delay information obtaining unit of the receiving apparatus includes an extracting circuit for extracting the delay information from the digital data received from the transmitting apparatus.

14. A digital data transmitting/receiving system according to claim 10, wherein the transmitting apparatus is a wireless audio transmitting apparatus includes a microphone, an analog/digital converter that carries out analog/digital conversion on an audio signal from the microphone, and a modulating/transmitting unit for transmitting radio waves modulated by a digital audio signal from the analog/digital converter, and the receiving apparatus is a wireless audio receiving apparatus that includes a receiving/demodulating unit for receiving the radio waves transmitted from the wireless audio transmitting apparatus and demodulating the digital audio signal, and an audio output terminal for outputting the digital audio signal demodulated by the receiving/demodulating unit.

15. A transmitting apparatus for transmitting digital data comprising:

a storage unit for storing a delay for digital data due to digital processing inside the transmitting apparatus; and a delay information transmitting unit for transmitting delay information indicating the delay stored in the storage unit, wherein the transmitting apparatus transmits the digital data to a receiving apparatus, the receiving apparatus comprising:

storage unit for storing a first delay for digital data due to digital processing inside the receiving apparatus;

delay information obtaining unit for obtaining the delay information, which shows a second delay for the digital data, transmitted from the transmitting apparatus; and delay information generating unit for generating delay information indicating a total delay obtained from a total of the first delay stored in the storage unit and the second delay indicated by the delay information obtained by the delay information obtaining unit, wherein the receiving apparatus receives digital data transmitted from a plurality of transmitting apparatuses, wherein the delay information obtaining unit obtains respective delay information transmitted from the plurality of transmitting apparatuses, wherein the receiving apparatus further includes delay unit for delaying, based on the delay information obtained by the delay information obtaining unit, digital data aside from digital data with a longest delay of the digital data received from the plurality of transmitting apparatuses so as to match the longest delay, and wherein the delay information generating unit calculates a total of the first delay stored in the storage unit and the longest delay of delays indicated by the delay information obtained by the delay information obtaining unit.

16. A receiving apparatus for receiving digital data transmitted from a transmitting apparatus, comprising:

a storage unit for storing a first delay for digital data due to digital processing inside the receiving apparatus;

a delay information obtaining unit for obtaining the delay information, which shows a second delay for the digital data, transmitted from the transmitting apparatus; and a delay information generating unit for generating delay information indicating a total delay obtained from a total of the first delay stored in the storage unit and the second delay indicated by the delay information obtained by the delay information obtaining unit, wherein the receiving apparatus receives digital data transmitted from a plurality of the transmitting apparatuses, wherein the delay information obtaining unit of the receiving apparatus obtains respective delay information transmitted from the plurality of the transmitting apparatuses, wherein the receiving apparatus further includes a delay unit for delaying, based on the delay information obtained by the delay information obtaining unit, digital data aside from digital data with a longest delay of the digital data received from the plurality of transmitting apparatuses so as to match the longest delay, and wherein the delay information generating unit calculates a total of the second delay stored in the second storage unit and the longest delay of delays indicated by the delay information obtained by the delay information obtaining unit.

* * * * *